(12) United States Patent
Higano et al.

(10) Patent No.: US 9,030,635 B2
(45) Date of Patent: May 12, 2015

(54) LIQUID CRYSTAL DISPLAY DEVICE COMPRISING A STAGE HAVING AN ELECTRODE FORMATION SURFACE

(71) Applicant: Japan Display Inc., Minato-ku (JP)

(72) Inventors: Emi Higano, Tokyo (JP); Mitsutaka Okita, Tokyo (JP); Daiichi Suzuki, Tokyo (JP); Kenji Nakao, Tokyo (JP); Kazuhiro Nishiyama, Tokyo (JP)

(73) Assignee: Japan Display Inc., Minato-ku (JP)

( * ) Notice: Subject to any disclaimer, the term of this patent is extended or adjusted under 35 U.S.C. 154(b) by 78 days.

(21) Appl. No.: 14/025,947

(22) Filed: Sep. 13, 2013

(65) Prior Publication Data
US 2014/0078453 A1    Mar. 20, 2014

(30) Foreign Application Priority Data
Sep. 19, 2012 (JP) .................. 2012-205596

(51) Int. Cl.
*G02F 1/1337* (2006.01)
(52) U.S. Cl.
CPC .................. *G02F 1/1337* (2013.01)

(58) Field of Classification Search
CPC ....................................................... G02F 1/1337
USPC .................................................. 349/123, 130
See application file for complete search history.

(56) References Cited

U.S. PATENT DOCUMENTS

| 2007/0058123 A1* | 3/2007 | Um et al. ...................... 349/144 |
| 2010/0134707 A1* | 6/2010 | Kim et al. ....................... 349/37 |

FOREIGN PATENT DOCUMENTS

JP    2002-357827    12/2002

* cited by examiner

*Primary Examiner* — Paul Lee
(74) *Attorney, Agent, or Firm* — Oblon, McClelland, Maier & Neustadt, L.L.P.

(57) ABSTRACT

According to one embodiment, a liquid crystal display device includes a first substrate, a second substrate and a liquid crystal layer. The first substrate includes a first electrode, a stage including an electrode formation surface, a switching element, a second electrode and a first vertical alignment film. The second substrate includes a third electrode and a second vertical alignment film. The electrode formation surface is positioned closer to the second substrate than a portion of the first vertical alignment film, which opposes the first electrode.

11 Claims, 14 Drawing Sheets

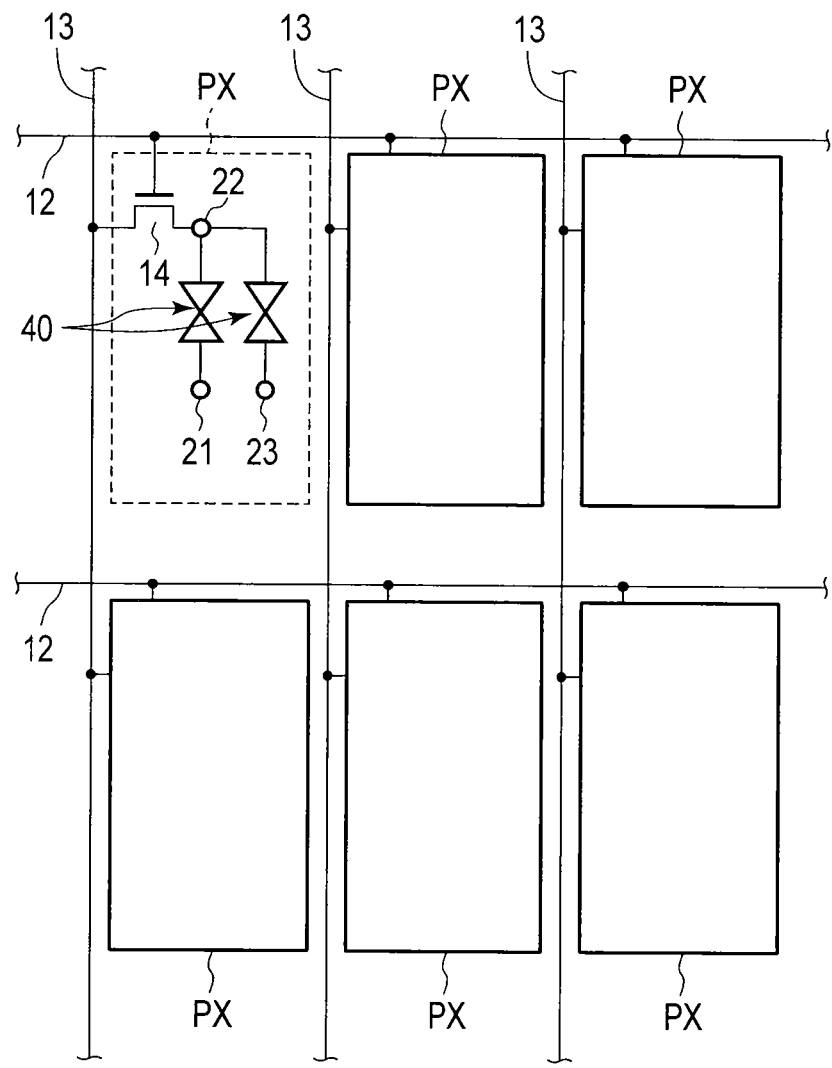
F I G. 2

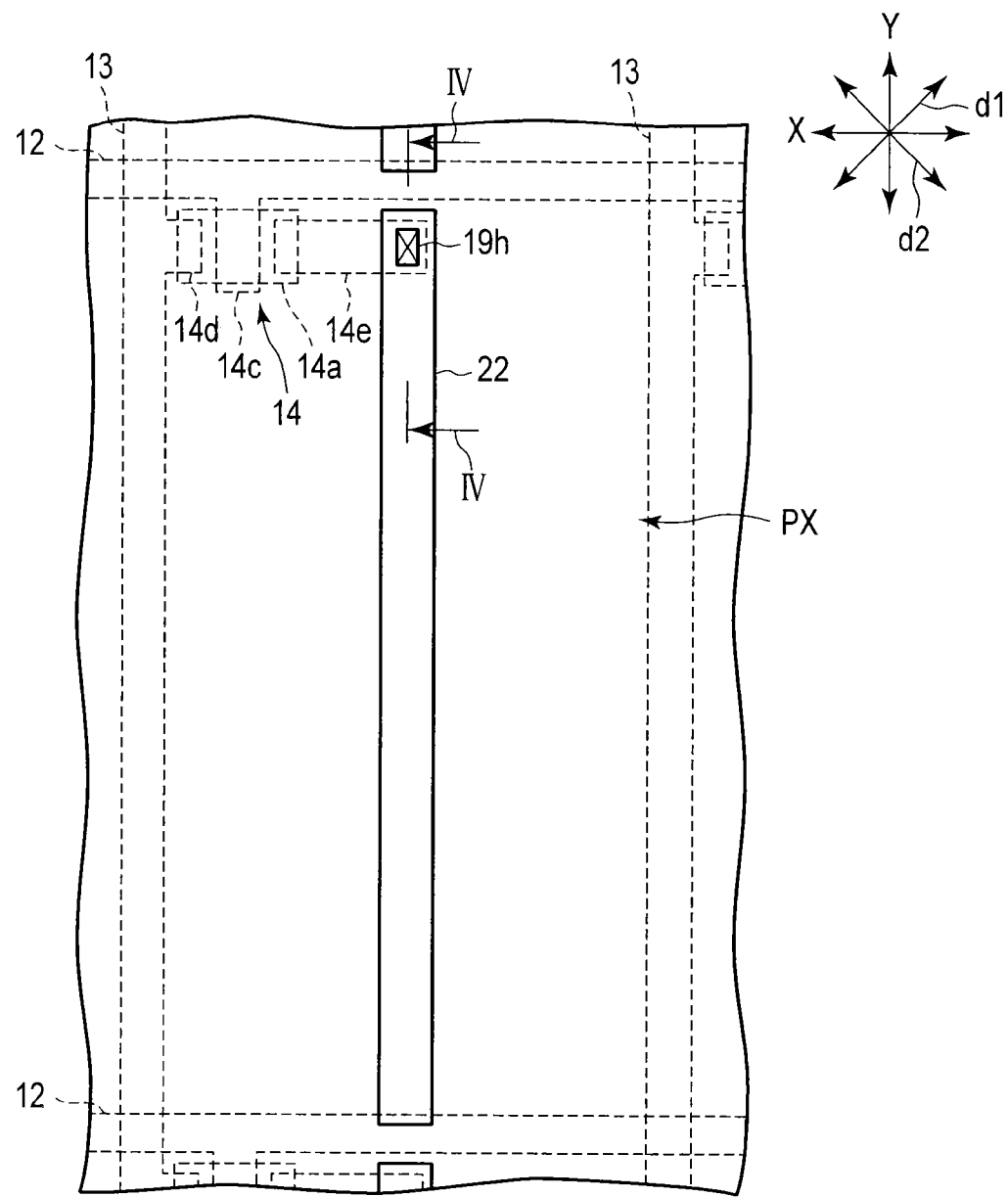
F I G. 3

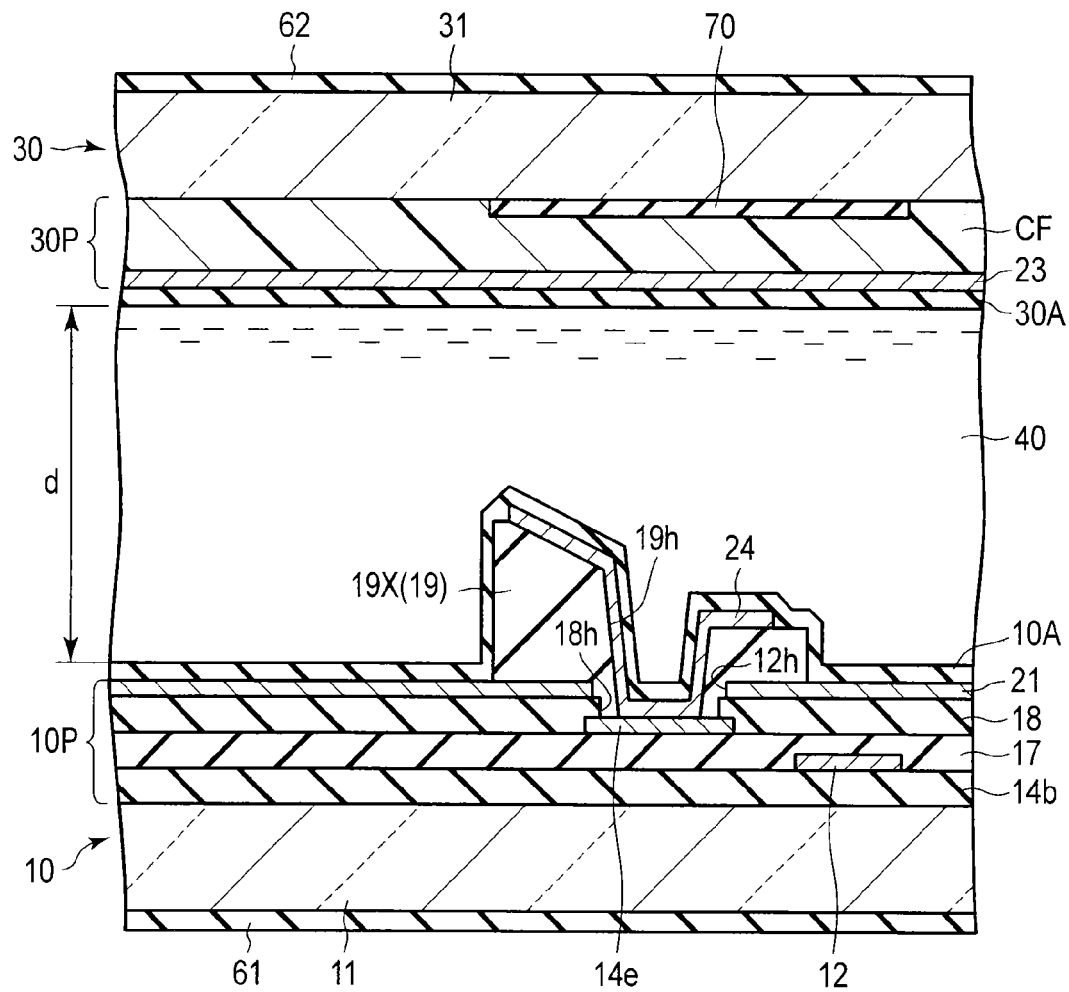
F I G. 8

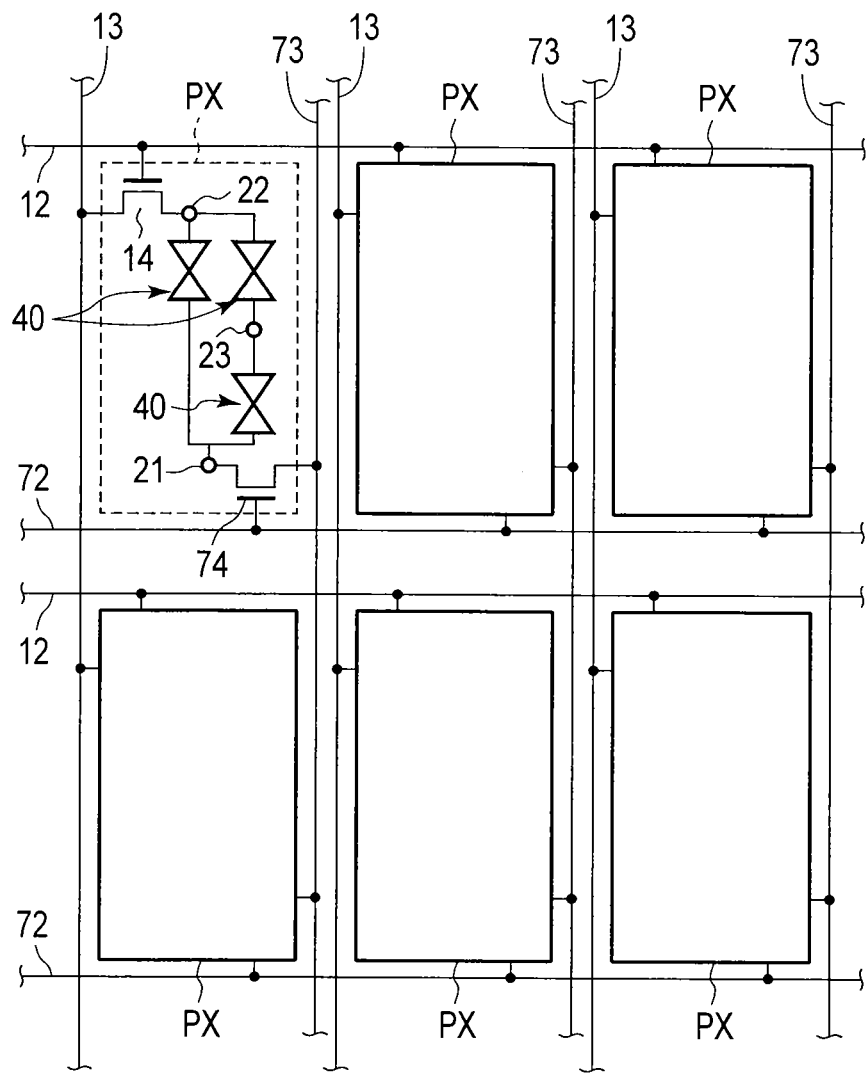
F I G. 11

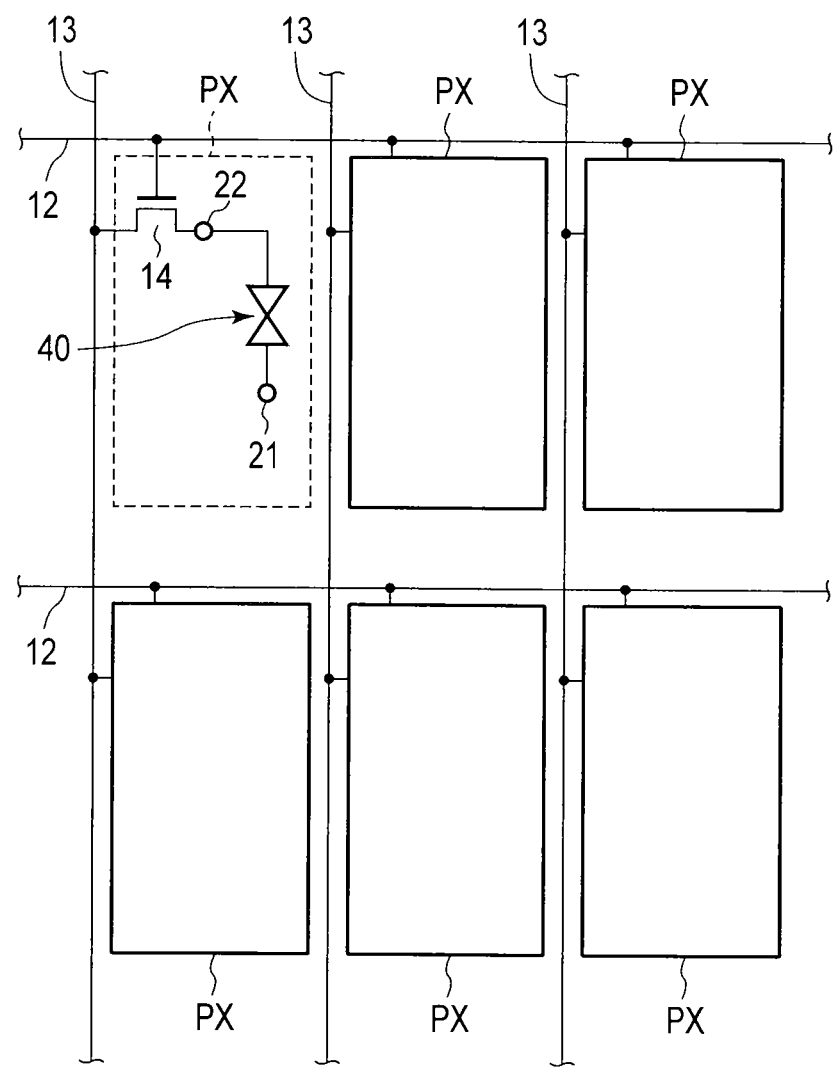
F I G. 15

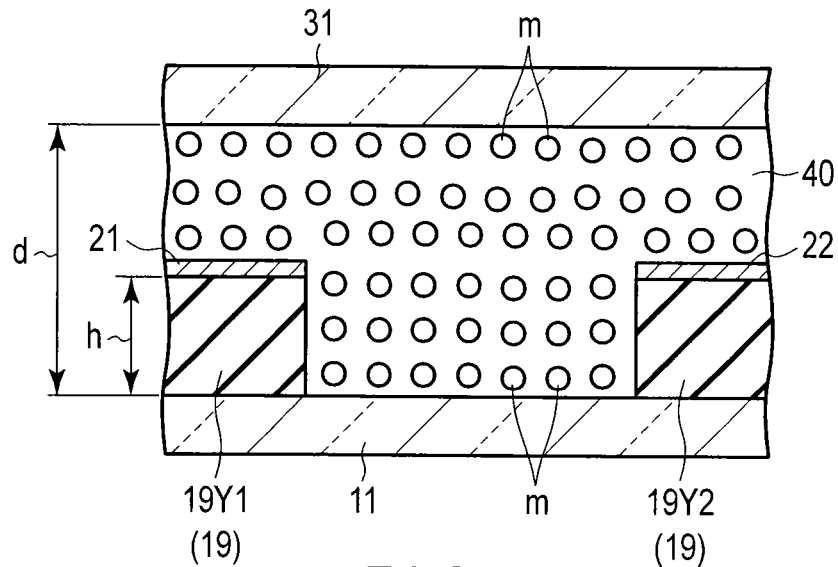
F I G. 17
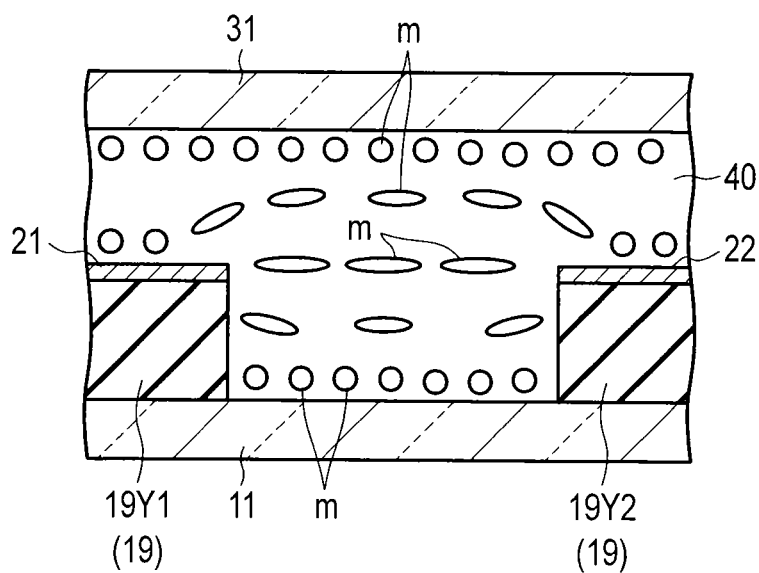
F I G. 18

LIQUID CRYSTAL DISPLAY DEVICE COMPRISING A STAGE HAVING AN ELECTRODE FORMATION SURFACE

CROSS-REFERENCE TO RELATED APPLICATIONS

This application is based upon and claims the benefit of priority from Japanese Patent Application No. 2012-205596, filed Sep. 19, 2012, the entire contents of which are incorporated herein by reference.

FIELD

Embodiments described herein relate generally to a liquid crystal display device.

BACKGROUND

Liquid crystal display devices are generally used as display devices. An OCB (Optically Compensated Bend) liquid crystal is used in a liquid crystal display device required to have a high response speed. The OCB-mode liquid crystal display device is configured by combining a it cell and an optically compensation film (retardation film). In the OCB-mode liquid crystal display device, the initial liquid crystal alignment state normally takes splay alignment. Therefore, the device must be operated after this alignment state is initially transited to a bend alignment state by applying a predetermined voltage. The OCB mode is a mode for compensating for the residual retardation (the retardation of a liquid crystal when displaying black) by an optically compensation film.

BRIEF DESCRIPTION OF THE DRAWINGS

FIG. 2 is a schematic diagram showing an equivalent circuit of a liquid crystal display panel shown in FIG. 1;

FIG. 3 is an enlarged plan view showing a part of an array substrate shown in FIG. 1, and is a view showing one pixel;

FIG. 8 is a sectional view showing a liquid crystal display panel taken along a line VIII-VIII in FIG. 7;

FIG. 11 is a schematic view showing an equivalent circuit of a liquid crystal display panel of a liquid crystal display device of the fourth embodiment;

FIG. 15 is a schematic view showing an equivalent circuit of a liquid crystal display panel of a liquid crystal display device of the sixth embodiment;

FIG. 17 is a sectional view specifically showing glass substrates, stages, first and second electrodes, and a liquid crystal layer of the sixth embodiment, and is a schematic view showing a state in which no voltage is applied to the liquid crystal layer; and FIG. 18 is a sectional view specifically showing the glass substrates, stages, first and second electrodes, and liquid crystal layer of the sixth embodiment, and is a schematic view showing a state in which a voltage is applied to the liquid crystal layer.

DETAILED DESCRIPTION

In general, according to one embodiment, there is provided a liquid crystal display device comprising: a first substrate comprising a first electrode, a stage including an electrode formation surface, a switching element, a second electrode provided on the electrode formation surface and electrically connected to the switching element, and a first vertical alignment film covering the first electrode and the second electrode; a second substrate which comprises a third electrode opposing the first electrode and the second electrode, and a second vertical alignment film covering the third electrode, and is arranged opposite to the first substrate with a gap therebetween; and a liquid crystal layer held between the first substrate and the second substrate. The electrode formation surface is positioned closer to the second substrate than a portion of the first vertical alignment film, which opposes the first electrode.

According to another embodiment, there is provided a liquid crystal display device comprising: a first substrate comprising a first stage including a first electrode formation surface, a first electrode provided on the first electrode formation surface, a second stage including a second electrode formation surface, a switching element, a second electrode provided on the second electrode formation surface, electrically connected to the switching element, and set at a potential independent of the first electrode, and a first horizontal alignment film covering the first electrode and the second electrode; a second substrate which comprises a second horizontal alignment film, and is arranged opposite to the first substrate with a gap therebetween; and a liquid crystal layer held between the first substrate and the second substrate. The first electrode formation surface and the second electrode formation surface are positioned closer to the second substrate than a portion of the first horizontal alignment film, which does not oppose the first stage, the first electrode, the second stage, and the second electrode.

A liquid crystal display device according to the first embodiment will be explained in detail below with reference to the accompanying drawings.

Figure 1:
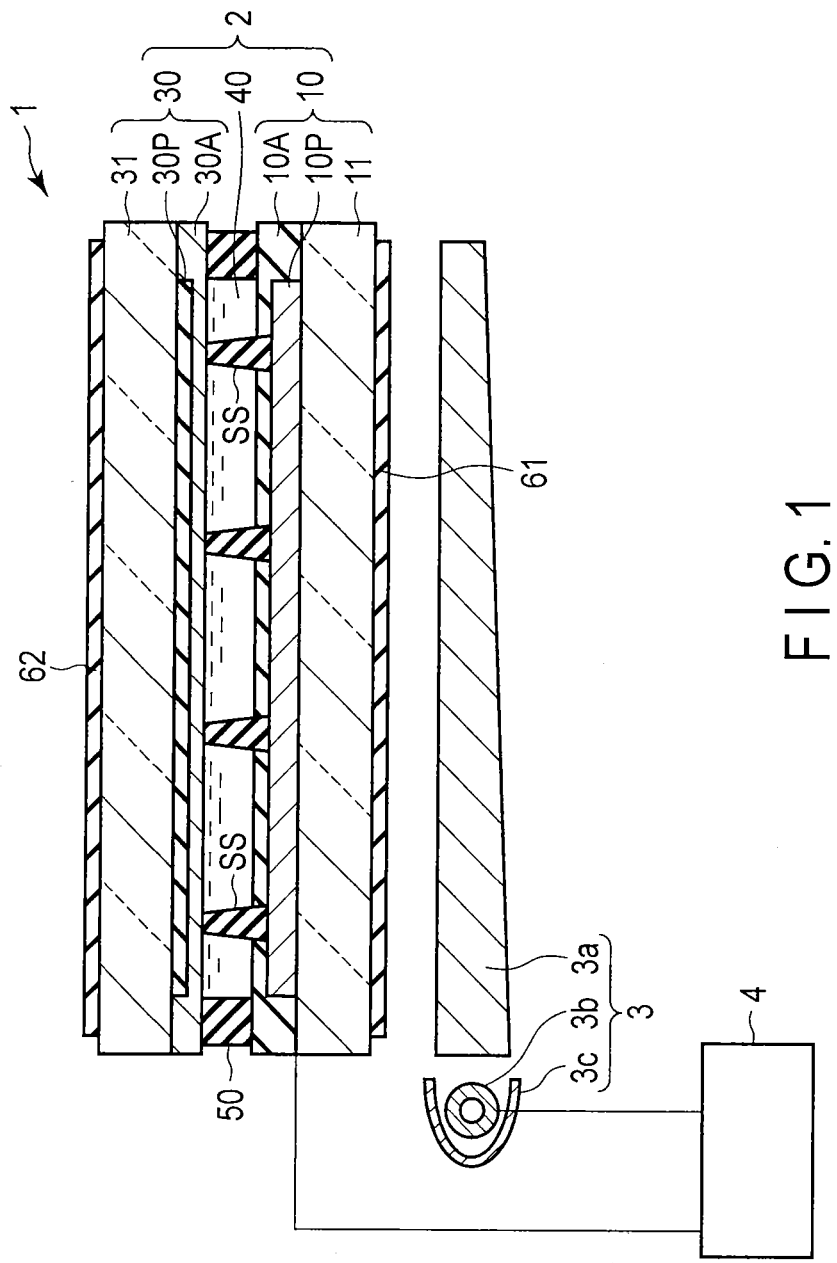
FIG. 1 is a block schematic diagram showing a liquid crystal display device of the first embodiment.

As shown in FIG. 1, a liquid crystal display device 1 comprises a liquid crystal display panel 2, backlight unit 3, and controller 4. The liquid crystal display panel 2 comprises an array substrate 10, a counter substrate 30 arranged opposite to the array substrate 10, and a liquid crystal layer 40 held between the array substrate 10 and counter substrate 30. In this embodiment, the array substrate 10 functions as a first substrate, and the counter substrate 30 functions as a second substrate.

The array substrate 10 comprises a rectangular glass substrate 11 as a transparent insulating substrate. An array pattern 10P is provided on the glass substrate 11. On the array pattern 10P, a plurality of columnar spacers SS or the like are formed as spacers. An alignment film 10A is provided on the glass substrate 11, array pattern 10P, and columnar spacers SS.

On the other hand, the counter substrate 30 comprises a rectangular glass substrate 31 as a transparent insulating substrate. A counter pattern 30P is provided on the glass substrate 31. An alignment film 30A is provided on the glass substrate 31 and counter pattern 30P.

The array pattern 10P or counter pattern 30P includes a color filter CF (to be described later). In this embodiment, the counter pattern 30P includes the color filter CF as will be described later. The color filter CF includes a plurality of colored layers of red, green, and blue.

The gap between the array substrate 10 and counter substrate 30 is held by the plurality of columnar spacers SS. The array substrate 10 and counter substrate 30 are bonded by a sealing member 50 formed along the outer periphery of a display area. The liquid crystal layer 40 is formed in a space surrounded by the array substrate 10, counter substrate 30, and sealing member 50.

A polarizer 61 is provided on the outer surface of the array substrate 10. A polarizer 62 is provided on the outer surface of the counter substrate 30.

As will be described later, the polarizer 61 has a transmissive axis parallel to a first direction d1 crossing a row direction X and column direction Y at about 45°. The polarizer 62 has a transmissive axis parallel to a second direction d2 crossing the row direction X and column direction Y at about 45°. The first direction d1 and second direction d2 are perpendicular to each other. Accordingly, the polarizers 61 and 62 are arranged by a crossed Nichol arrangement (see FIG. 3).

The backlight unit 3 is provided on the outer surface side of the array substrate 10. The backlight unit 3 includes a light-guiding member 3a including a light-guiding plate opposing the polarizer 61, and a light source 3b such as a cold cathode ray tube and a reflecting plate 3c opposed to each other near one edge of the light-guiding member 3a.

Next, the liquid crystal display panel 2 will be explained below.

As shown in FIGS. 1, 2, 3, and 4, a plurality of scanning lines 12 and a plurality of signal lines 13 are provided on the glass substrate 11. The scanning lines 12 extend in the row direction X parallel to the plane (surface) of the glass substrate 11. The signal lines 13 extend in the column direction Y parallel to the plane (surface) of the glass substrate 11 and perpendicular to the row direction X. In the display area, the scanning lines 12 and signal lines 13 are formed into a lattice by crossing each other.

Switching elements, e.g., TFTs (Thin Film Transistors) 14 are formed near the intersections of the scanning lines 12 and signal lines 13. The TFTs 14 are provided on the glass substrate 11 in one-to-one correspondence with pixels PX.

The TFT 14 includes a semiconductor layer 14a, gate insulating film 14b, gate electrode 14c, source electrode 14d, and drain electrode 14e. The semiconductor layer 14a is formed on the glass substrate 11. The gate insulating film 14b is provided on the glass substrate 11 and semiconductor layer 14a. The gate electrode 14c is provided on the gate insulating film 14b by extending a portion of the scanning line 12, and opposes the semiconductor layer 14a.

The source electrode 14d is provided on an interlayer dielectric film 17, and electrically connected to the source region of the semiconductor layer 14a through a contact hole formed in the gate insulating film 14b and interlayer dielectric film 17. The source electrode 14d is connected to the signal line 13. In this embodiment, the source electrode 14d and signal line 13 are integrated.

The drain electrode 14e is provided on the interlayer dielectric film 17, and electrically connected to the drain region of the semiconductor layer 14a through a contact hole formed in the gate insulating film 14b and interlayer dielectric film 17. As will be described later, the drain electrode 14e is connected to a second electrode 22. An insulating layer 18 is provided on the glass substrate 11, scanning lines 12, signal lines 13, TFTs 14, and interlayer dielectric film 17. The insulating layer 18 has a contact hole 18h opposing the drain electrode 14e.

A first electrode 21 is provided on the insulating layer 18. The first electrode 21 is made of, e.g., ITO (Indium Tin Oxide) as a light-transmitting conductive material (transparent conductive material). In this electrode, the first electrode 21 is a solid electrode, provided on the entire display area, and shared by the plurality of pixels PX. Accordingly, the first electrode 21 is a common electrode. The first electrode 21 includes a plurality of openings 21h opposing the drain electrodes 14e of the plurality of TFTs 14. Also, the opening 21h surrounds the outer periphery of the contact hole 18h in order to maintain the electrically insulated state between the first electrode 21 and drain electrode 14e.

Note that the first electrode 21 is not limited to a solid electrode, and may also be deformed into various shapes. For example, the first electrode 21 may also include a plurality of band-like electrodes positioned outside regions opposing the drain electrodes 14e, extending in the row direction X, spaced apart from each other in the column direction Y, and electrically connected to each other. In this case, each band-like electrode is shared by a plurality of pixels PX arranged in the row direction X.

A plurality of stages 19 including electrode formation surfaces are provided on the insulating layer 18 and first electrode 21. The stages 19 are made of an insulating material. In this embodiment, the plurality of stages 19 are formed into bands linearly extending along the column direction Y, and spaced apart from each other in the row direction X. Each stage 19 is formed into a band linearly extending along the column direction Y in an almost central section of the pixel PX. Each stage 19 is shared by a plurality of pixels PX arranged in the column direction Y. The stage 19 includes a contact hole 19h opposing the drain electrode 14e, contact hole 18h, and opening 21h.

In this embodiment, the stage 19 is formed high. As will be described later, the height of the stage 19 is almost 2 μm. As the height of the stage 19 increases, it becomes difficult to appropriately form the contact hole 19h. Therefore, the stage 19 is formed such that a portion of the stage 19, which opposes the drain electrode 14e, is lower than other portions. In this embodiment, the surface of the portion of the stage 19, which opposes the drain electrode 14e, is formed into a tapered surface. From the foregoing, the contact hole 19h can be formed well even when the stage 19 is formed high.

Second electrodes 22 are formed into islands. The second electrodes 22 are arranged in a matrix. The second electrode 22 is provided on the electrode formation surface of the stage 19. The second electrode 22 is formed into a band linearly extending along the column direction Y in an almost central section of the pixel PX. The second electrodes 22 of adjacent pixels PX are spaced apart and electrically insulated from each other. A portion of the second electrode 22 opposes the drain electrode 14e. The second electrode 22 is electrically connected to the drain electrode 14e through the contact holes 18h and 19h. The second electrode 22 is formed apart from the opening 21h. The second electrode 22 is made of a conductive material (e.g., ITO).

Note that the stage 19 can be made of a light-transmitting insulating material, but may also be made of a light-shielding insulating material. This is so because in this embodiment, no polarization modulation occurs and black is always displayed in a region of the liquid crystal layer 40, which opposes the stage 19 (second electrode 22).

As described above, whether the second electrode 22 has light transmittance poses no problem when black is always displayed in the region opposing the second electrode 22. However, the stage 19 and second electrode 22 preferably have light transmittance from the viewpoint of the contrast.

Note that if the region opposing the second electrode 22 helps improve the transmittance unlike in this embodiment, the second electrode 22 need not have light transmittance. This is so because the liquid crystal display device is not limited to a transmitting type device, and may also be a transreflective type device. In the latter case, the second electrode 22 can be formed by a light-reflecting conductive material (e.g., aluminum).

As described above, the array pattern 10P is provided on the glass substrate 11. The plurality of columnar spacers SS are provided on the array pattern 10P. The columnar spacers SS oppose the scanning lines 12. In this embodiment, the columnar spacers SS oppose the intersections of the scanning lines 12 and signal lines 13. Note that the columnar spacers SS may also be provided on pedestals (not shown). For example, the pedestals and stages 19 can be formed at the same time by using the same material.

The alignment film 10A is provided on the array pattern 10P and columnar spacers SS. The alignment film 10A covers the first electrode 21, second electrodes 22, and the like. In this embodiment, the alignment film 10A is a vertical alignment film. The electrode formation surface of the stage 19 is positioned closer to the counter substrate 30 than a portion of the alignment film 10A, which opposes the first electrode 21.

On the other hand, on the glass substrate 31 of the counter substrate 30, a plurality of first light-shielding layers 70, a plurality of second light-shielding layers (not shown), and a peripheral light-shielding layer (not shown) are formed. The first light-shielding layers 70 are formed into bands extending in the row direction X. The first light-shielding layers 70 oppose the scanning lines 12 and contact holes 19h. The first light-shielding layers 70 intersect the plurality of signal lines 13. The second light-shielding layers are formed into bands extending in the column direction Y, and oppose the signal lines 13. The first light-shielding layers 70 and second light-shielding layers form a black matrix. The peripheral light-shielding layer is formed into a rectangular frame, and surrounds the outer periphery of the display area. The peripheral light-shielding layer has a function of preventing leakage of light from the outer periphery of the display area.

The color filter CF is provided on the glass substrate 31, first light-shielding layers 70, second light-shielding layers, and peripheral light-shielding layer. The color filter CF includes colored layers of a plurality of colors. The colored layers are arranged in one-to-one correspondence with the pixels PX. The colored layers are formed to extend in the column direction Y. The colored layers of the plurality of colors are repetitively arranged in the row direction X. The edges of the colored layers oppose the second light-shielding layers (signal lines 13). For example, the color filter CF includes colored layers of red, green, and blue.

A third electrode 23 is provided on the color filter CF. The third electrode 23 opposes the first electrode 21 and second electrodes 22. The third electrode 23 is made of a light-transmitting conductive material, e.g., ITO. In this embodiment, the third electrode 23 is a solid electrode, provided on the entire display area, and shared by the plurality of pixels PX. Accordingly, the third electrode 23 is a common electrode. The first and third electrodes are set at the same potential.

As described above, the counter pattern 30P is provided on the glass substrate 31. The alignment film 30A is provided on the glass substrate 31 and counter pattern 30P. The alignment film 30A covers the third electrode 23 and the like. In this embodiment, the alignment film 30A is a vertical alignment film.

The liquid crystal layer 40 is held between the array substrate 10 and counter substrate 30. In this embodiment, the liquid crystal layer 40 is made of a positive-type liquid crystal material. The liquid crystal layer 40 is formed from a liquid crystal material which is positive in dielectric anisotropy.

The liquid crystal display panel 2 is a normally black type panel that shields light when no voltage is applied to the liquid crystal layer 40.

The controller 4 sets the potentials of the first electrode 21, second electrodes 22, and third electrode 23. For example, the controller 4 sets the first electrode 21 and third electrode 23 at a predetermined potential such as the ground potential, and sets the potential of the second electrodes 22 at a value independent of the first electrode 21 and third electrode 23 by controlling the TFTs 14.

Figure 5:
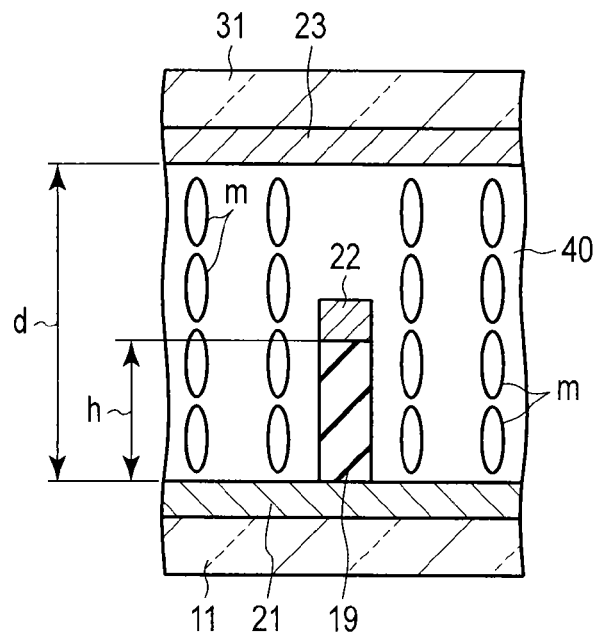
FIG. 5 is a sectional view specifically showing glass substrates, a stage, first to third electrodes, and a liquid crystal layer of the first embodiment, and is a schematic view showing a state in which no voltage is applied to the liquid crystal layer.
Figure 6:
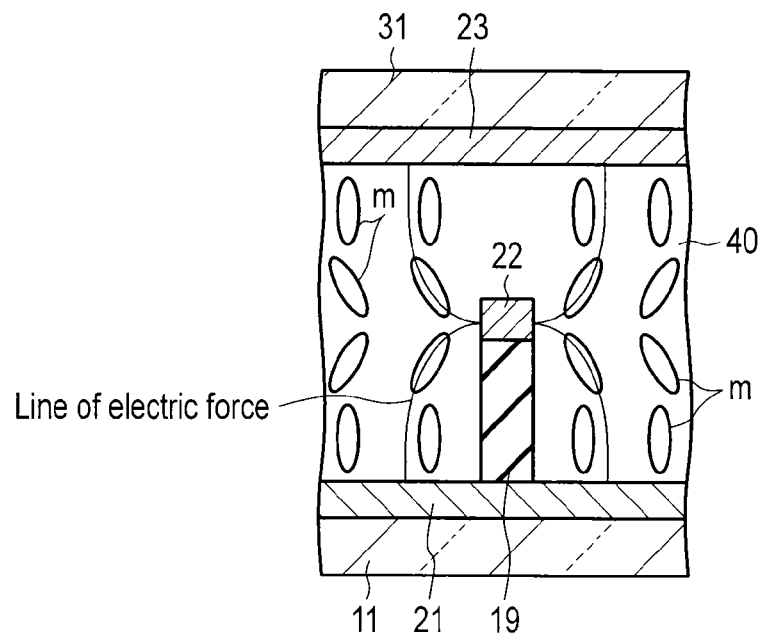
FIG. 6 is a sectional view specifically showing the glass substrates, stage, first to third electrodes, and liquid crystal layer of the first embodiment, and is a schematic view showing a state in which a voltage is applied to the liquid crystal layer.

FIGS. 5 and 6 specifically show the glass substrate 11, first electrode 21, stage 19, second electrode 22, glass substrate 31, third electrode 23, and liquid crystal layer 40 of the liquid crystal display panel 2.

In this embodiment as shown in FIG. 5, a thickness (a cell gap: the distance between the portion of the alignment film 10A, which opposes the first electrode 21, and the alignment film 30A) d of the liquid crystal layer 40 is, e.g., about 4 μm. A height h of the stage 19 is about 2 μm. In this embodiment, therefore, the second electrode 22 is positioned in the center of the liquid crystal layer 40 in the thickness direction. Also, the height h of the stage 19 is so set that the second electrode 22 is positioned as described above.

The first, second, and third electrodes 21, 22, and 23 are so set as to apply no electric field in a no-voltage-applied state, i.e., when no voltage is applied across the first and second electrodes 21 and 22, and across the second and third electrodes 22 and 23. In this no-voltage-applied state, the alignment direction of liquid crystal molecules m remains unchanged from the initial state, so the alignment of liquid crystal molecules of the liquid crystal layer 40 maintains the initial alignment, i.e., vertical alignment.

The polarized light of backlight transmitted through the polarizer 61 is maintained in the liquid crystal layer 40, and is perpendicular to the transmission axis of the polarizer 62. Accordingly, the probability (transmittance) at which the polarized light entering the polarizer 62 from the liquid crystal layer 40 is transmitted through the polarizer 62 is approximately 0%. This allows the polarizer 62 to shield the polarized light entering from the liquid crystal layer 40, and sufficiently display black. From the foregoing, black can be emphasized in the no-voltage-applied state, and this contributes to a high contrast.

As shown in FIG. 6, the first, second, and third electrodes 21, 22, and 23 are so set as to apply an electric field in a voltage-applied state, i.e., when a voltage is applied across the first and second electrodes 21 and 22, and across the second and third electrodes 22 and 23. In this voltage-applied state, the alignment direction of the liquid crystal molecules m changes from the initial state along the lines of electric force.

The second electrode 22 is positioned in the center of the liquid crystal layer 40 in the thickness direction. The liquid crystal molecules m in the central section of the liquid crystal layer 40 are aligned almost horizontally (the pretilt angle is almost zero). Also, the liquid crystal molecules m are aligned to have a pretilt angle at which they are symmetrical near the alignment films 10A and 30A with respect to the central section of the liquid crystal layer 40 as a boundary. Accordingly, the alignment in the region of the liquid crystal layer 40 between the first and third electrodes 21 and 23 is splay alignment.

According to the liquid crystal display device of the first embodiment configured as described above, the liquid crystal display device 1 comprises the array substrate 10, counter substrate 30, and liquid crystal layer 40. The array substrate 10 includes the first electrode 21, the stages 19 including the electrode formation surface, the TFTs 14, the second electrodes 22, and the alignment film 10A. The electrode formation surface of the stage 19 is positioned closer to the counter substrate 30 than the portion of the alignment film 10A, which opposes the first electrode 21. The counter substrate 30 includes the third electrode 23 and alignment film 30A.

The liquid crystal layer 40 is made of a positive-type liquid crystal material, and the alignment direction of the liquid crystal molecules m changes along the lines of electric force. When a voltage is applied to the liquid crystal layer 40 (when white is displayed), the alignment in the region of the liquid crystal layer 40 between the first and third electrodes 21 and 23 takes splay alignment. Therefore, the liquid crystal display panel 2 can have a high response speed equal to that in the OCB mode that takes bend alignment.

Also, when no voltage is applied to the liquid crystal layer 40 (when black is displayed), the alignment of the liquid crystal layer 40 (liquid crystal molecules m) is vertical alignment. Since the alignment of the liquid crystal layer 40 (liquid crystal molecules m) is not bend alignment unlike in the OCB mode, the residual retardation (the retardation of a liquid crystal when displaying black) does not occur in the liquid crystal display panel 2. Since black can be emphasized when displayed, the liquid crystal display device 1 can have a high contrast.

The liquid crystal display device 1 can be formed without any optically compensation film (retardation film) because it is unnecessary to compensate for the residual retardation. This makes it possible to reduce the constituent members and manufacturing steps of the liquid crystal display device 1, thereby reducing its manufacturing cost.

From the foregoing, a liquid crystal display device having a high contrast and high response speed can be obtained.

Next, a liquid crystal display device according to the second embodiment will be explained. In this embodiment, the same reference numerals as in the above-described first embodiment denote the same functional parts, and a detailed explanation thereof will be omitted.

Figure 9:
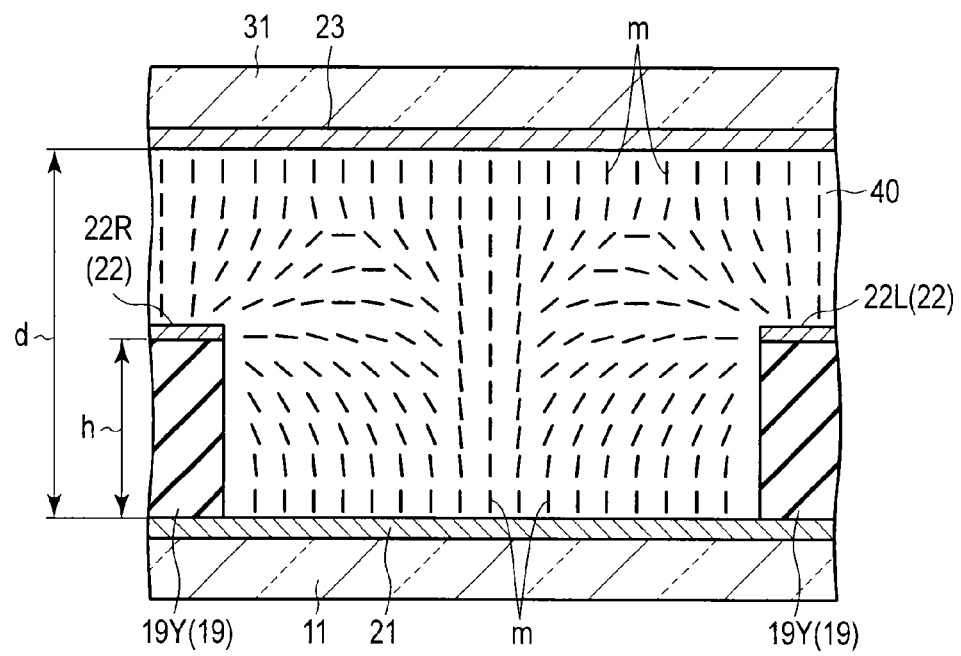
FIG. 9 is a sectional view specifically showing glass substrates, stages, first to third electrodes, and a liquid crystal layer of the second embodiment, and is a schematic view showing a state in which a voltage is applied to the liquid crystal layer.

FIG. 9 specifically shows a glass substrate 11, a first electrode 21, stages 19 (19Y), second electrodes 22 (22R and 22L), a glass substrate 31, a third electrode 23, and a liquid crystal layer 40 of a liquid crystal display panel 2.

Figure 7:
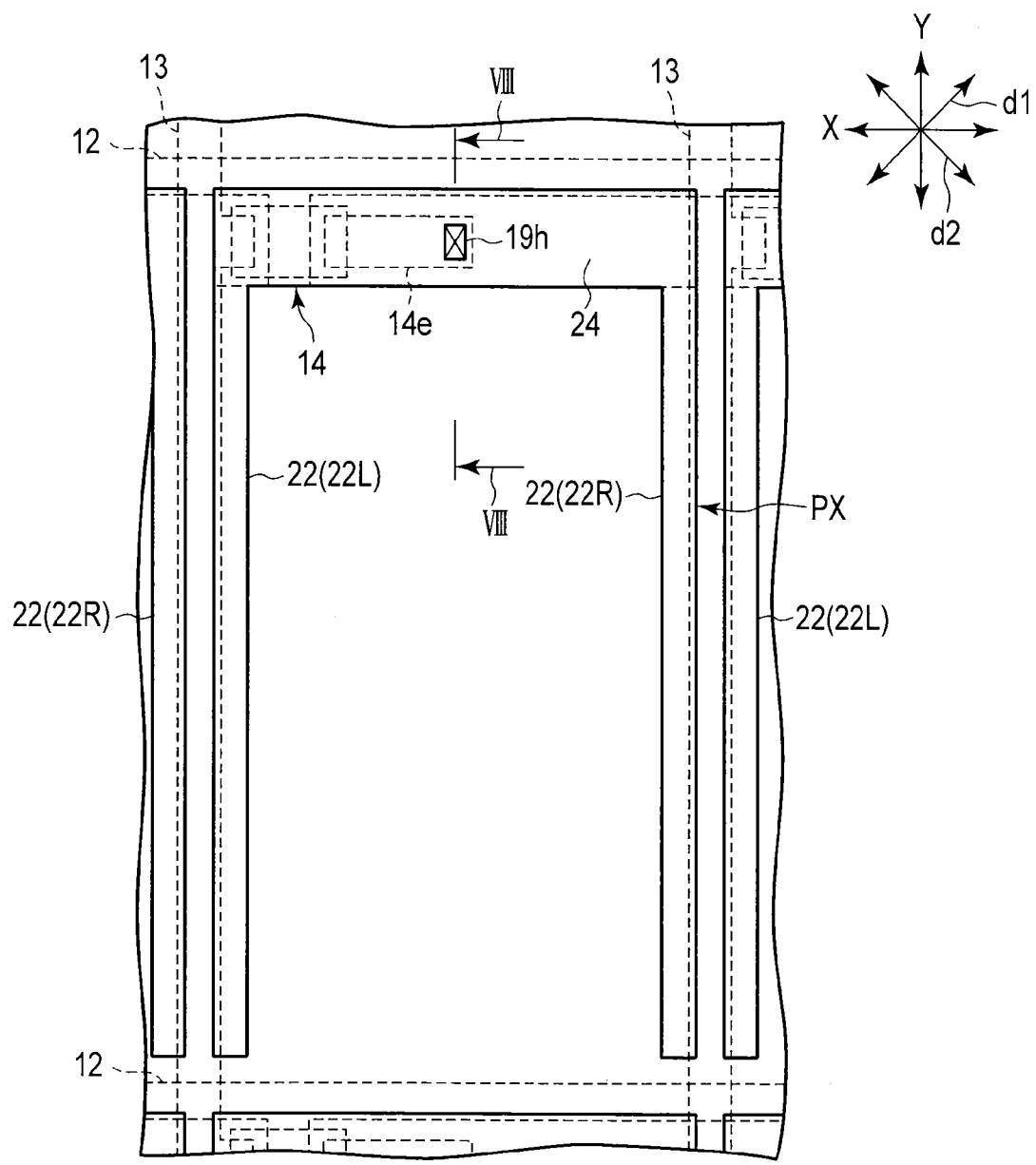
FIG. 7 is an enlarged plan view showing a part of an array substrate of a liquid crystal display device of the second embodiment, and is a view showing one pixel.

As shown in FIGS. 7, 8, and 9, each pixel PX may also include a plurality of second electrodes 22. In this embodiment, each pixel PX includes two second electrodes 22. The two second electrodes 22 are arranged parallel in a row direction X, and arranged in the left and right end sections of the pixel PX. In the following explanation, to distinguish between the two second electrodes 22, the second electrode on the left side of the drawings will be referred to as 22L, and that on the right side of the drawings will be referred to as 22R.

In the pixel PX, the second electrode 22L is positioned in the left end section, and the second electrode 22R is positioned in the right end section. The second electrode 22L of the pixel PX opposes the side edge of a signal line 13, and is spaced apart from the second electrode 22R of an adjacent pixel on the left side of the pixel PX. The second electrode 22R of the pixel PX opposes the side edge of the signal line 13, and is spaced apart from the second electrode 22L of an adjacent pixel on the right side of the pixel PX.

A connection electrode 24 is also provided on the electrode formation surface of the stage 19. In this embodiment, the connection electrode 24 is integrated with the second electrodes 22L and 22R by using the same material, and electrically connects the second electrodes 22L and 22R. The second electrode 22L, second electrode 22R, and connection electrode 24 are formed into the shape of Π.

In this embodiment, the connection electrode 24 is formed on the upper end section of the pixel PX, and spaced apart from the second electrodes 22 and connection electrode 24 of an adjacent pixel PX. A part of the connection electrode 24 opposes a drain electrode 14e. The connection electrode 24 is electrically connected to the drain electrode 14e through a contact hole 19h and the like.

The plurality of stages 19 linearly extend along a column direction Y or the row direction X, and are formed into a lattice. In the following explanation, to distinguish between the stages 19, stages extending in the column direction Y will be referred to as 19Y, and those extending along the row direction X will be referred to as 19X. The stages 19Y and 19X are integrated.

The stages 19Y are formed apart from each other in the row direction X. Each stage 19Y is formed into a band linearly extending along the column direction Y in the boundary between the pixels PX. Each stage 19Y opposes the signal line 13, the second electrode 22R of the pixel PX on the left side of the signal line 13, and the second electrode 22L of the pixel PX on the right side of the signal line 13. Therefore, each stage 19Y includes an electrode formation surface for the second electrode 22R, and that for the second electrode 22L.

The stages 19X are formed apart from each other in the column direction Y. Each stage 19X is formed into a band linearly extending along the row direction X in the boundary between the pixels PX. Each stage 19X opposes the connection electrode 24. The stage 19X includes the contact hole 19h.

In this embodiment, the stage 19X includes a tapered surface, and the contact hole 19h is open to the tapered surface. This makes it possible to sufficiently form the contact hole 19h.

Also, in this embodiment, a thickness (a cell gap: the distance between a portion of an alignment film 10A, which opposes the first electrode 21, and an alignment film 30A) d of the liquid crystal layer 40 is, e.g., about 4 µm. A height h of the stage 19Y is about 2 µm. In this embodiment, therefore, the second electrodes 22L and 22R are positioned in the center of the liquid crystal layer 40 in the thickness direction. In addition, the height h of the stage 19Y is so set that the second electrodes 22L and 22R are positioned as described above.

When no voltage is applied, the alignment of the liquid crystal layer 40 is vertical alignment. When a voltage is applied, the alignment of the liquid crystal layer 40 is splay alignment.

According to the liquid crystal display device of the second embodiment configured as described above, each pixel PX may include a plurality of second electrodes 22. The same effects as those of the above-described first embodiment can be obtained in this case as well.

From the foregoing, a liquid crystal display device having a high contrast and high response speed can be obtained.

A liquid crystal display device according to the third embodiment will be explained below. In this embodiment, the same reference numerals as in the above-described second embodiment denote the same functional parts, and a detailed explanation thereof will be omitted.

Figure 10:
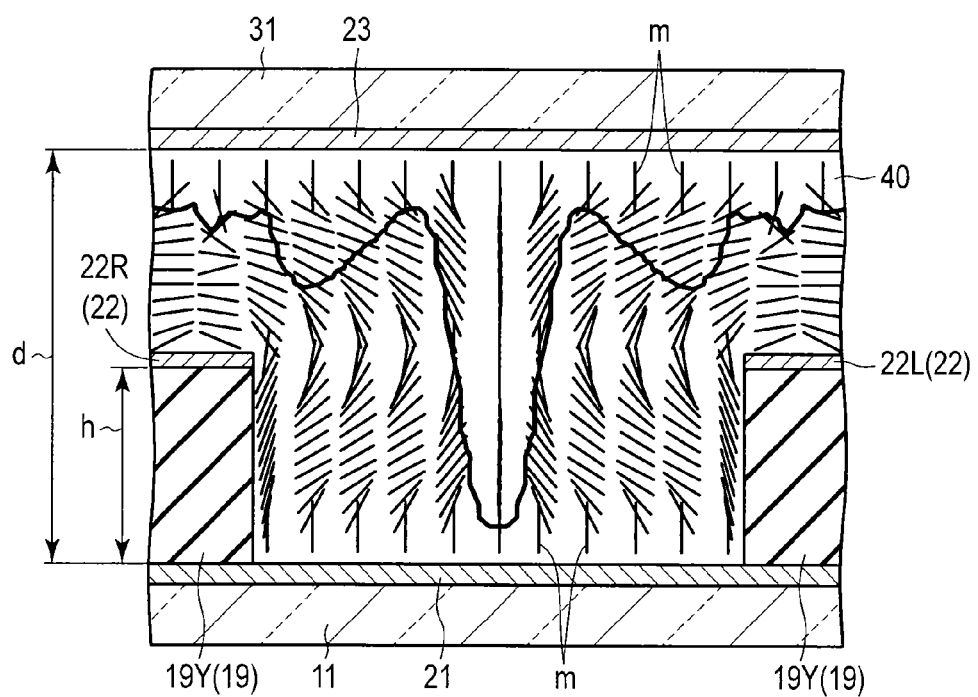
FIG. 10 is a sectional view specifically showing glass substrates, stages, first to third electrodes, and a liquid crystal layer of a liquid crystal display device of the third embodiment, and is a schematic view showing a state in which a voltage is applied to the liquid crystal layer.

FIG. 10 specifically shows a glass substrate 11, a first electrode 21, stages 19 (19Y), second electrodes (22R and 22L), a glass substrate 31, a third electrode 23, and a liquid crystal layer 40 of a liquid crystal display panel 2.

As shown in FIG. 10, the liquid crystal layer 40 is made of a negative-type liquid crystal material. The stages 19Y (19) are made of a light-transmitting insulating material. This is so because in this embodiment, polarization modulation occurs in a region of the liquid crystal layer 40, which opposes the stage 19Y (the second electrode 22).

Note that each pixel PX includes two second electrodes 22, but the present invention is not limited to this, and each pixel PX may also include one second electrode 22 or three or more second electrodes 22.

When no voltage is applied, the alignment of the liquid crystal layer 40 is vertical alignment.

When a voltage is applied, the alignment direction of liquid crystal molecules m changes into a direction perpendicular to the lines of electric force. The second electrodes 22 are positioned in the center of the liquid crystal layer 40 in the thickness direction. The liquid crystal molecules m in the central section of the liquid crystal layer 40 are aligned almost vertical. Also, the liquid crystal molecules m are aligned to have a pretilt angle at which they are symmetrical near alignment films 10A and 30A with respect to the central section of the liquid crystal layer 40 as a boundary. Accordingly, the alignment in the region of the liquid crystal layer 40 between the first and third electrodes 21 and 23 is bend alignment.

In this state, the alignment direction of the liquid crystal molecules m in a region of the liquid crystal layer 40, which opposes the second electrode 22, also changes, and the liquid crystal molecules m are aligned almost horizontally. Consequently, polarization modulation occurs even in the region of the liquid crystal layer 40, which opposes the second electrode 22.

According to the liquid crystal display device of the third embodiment configured as described above, the liquid crystal layer 40 is made of a negative-type liquid crystal material.

When a voltage is applied to the liquid crystal layer 40 (when white is displayed), the alignment in the region of the liquid crystal layer 40 between the first and third electrodes 21 and 23 takes bend alignment. Therefore, the liquid crystal display panel 2 can have a high response speed equal to that in the OCB mode. Also, polarization modulation occurs even in the region of the liquid crystal layer 40, which opposes the second electrode 22, and contributes to image display. Accordingly, a liquid crystal display device 1 can have a higher contrast.

Furthermore, when no voltage is applied to the liquid crystal layer 40 (when black is displayed), the alignment of the liquid crystal layer 40 (liquid crystal molecules m) is vertical alignment. Since black can be emphasized when displayed, the liquid crystal display device 1 can have a high contrast. This makes it possible to reduce the manufacturing cost.

From the foregoing, a liquid crystal display device having a high contrast and high response speed can be obtained.

A liquid crystal display device according to the fourth embodiment will be explained below. In this embodiment, the same reference numerals as in the above-described third embodiment denote the same functional parts, and a detailed explanation thereof will be omitted.

Figure 13:
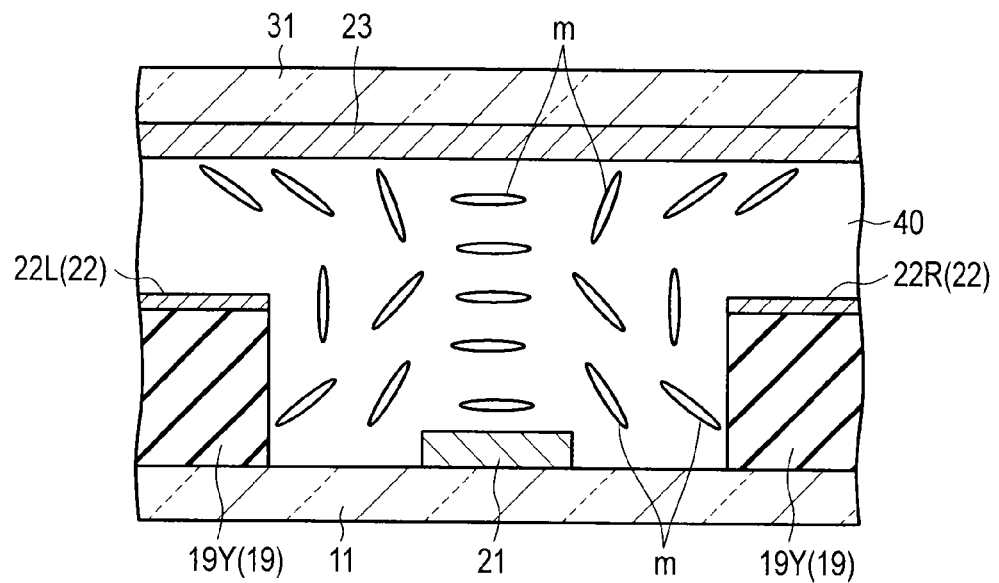
FIG. 13 is a sectional view specifically showing glass substrates, stages, first to third electrodes, and a liquid crystal layer of the fourth embodiment, and is a schematic view showing a state in which a voltage is applied to the liquid crystal layer.

FIG. 13 specifically shows a glass substrate 11, a first electrode 21, stages 19 (19Y), second electrodes 22 (22R and 22L), a glass substrate 31, a third electrode 23, and a liquid crystal layer 40 of a liquid crystal display panel 2.

Figure 12:
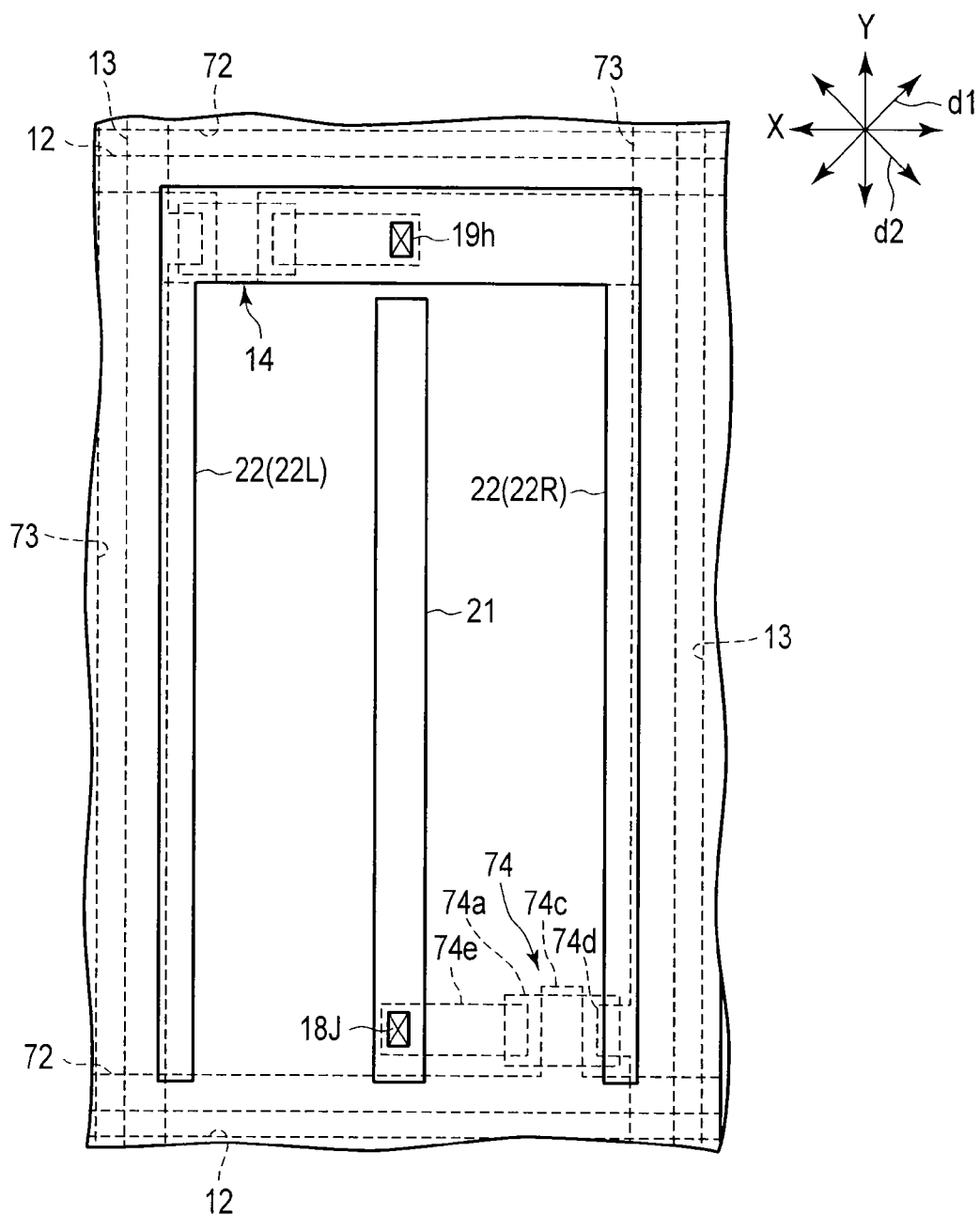
FIG. 12 is an enlarged plan view showing a part of an array substrate shown in FIG. 11, and is a view showing one pixel.

As shown in FIGS. 11, 12, and 13, an array substrate 10 further includes a plurality of other scanning lines 72, a plurality of other signal lines 73, and a plurality of other TFTs 74.

The scanning lines 72 are provided on a gate insulating film 14b, and extend in a row direction X. The scanning lines 72 are positioned near the lower end sections of pixels PX. The scanning lines 72 and scanning lines 12 are formed at the same time by using the same material.

The signal lines 73 are provided on an interlayer dielectric film 17, and extend in a column direction Y. The signal lines 73 are positioned near the right end sections of the pixels PX. Note that signal lines 13 are positioned near the left end sections of the pixels PX. The signal lines 73 and signal lines 13 are formed at the same time by using the same material.

The TFTs 74 as switching elements are formed near the intersections of the scanning lines 72 and signal lines 73. The TFTs 74 are formed in one-to-one correspondence with the pixels PX. The TFT 74 includes a semiconductor layer 74a, gate insulating film 14b, gate electrode 74c, source electrode 74d, and drain electrode 74e.

The semiconductor layer 74a is provided on the glass substrate 11. The semiconductor layer 74a and a semiconductor layer 14a are formed at the same time by using the same material. The gate electrode 74c is provided on the gate insulating film 14b by extending a part of the scanning line 72, and opposes the semiconductor layer 74a.

The source electrode 74d is provided on the interlayer dielectric film 17, and electrically connected to the source region of the semiconductor layer 74a through a contact hole formed in the gate insulating film 14b and interlayer dielectric film 17. The source electrode 74d is connected to the signal line 73. In this embodiment, the source electrode 74d is integrated with the signal line 73.

The drain electrode 74e is provided on the interlayer dielectric film 17, and electrically connected to the drain region of the semiconductor layer 74a through a contact hole formed in the gate insulating film 74b and interlayer dielectric film 17. As will be described later, the drain electrode 74e is connected to the first electrode 21. The drain electrode 74e and a drain electrode 14e are formed at the same time by using the same material. An insulating layer 18 has a contact hole 18J opposing the drain electrode 74e.

The first electrodes 21 are formed into islands on the insulating layer 18. Note that in this embodiment, the first electrodes 21 are, of course, not a solid electrode. The first electrodes 21 are arranged in a matrix. In this embodiment, the first electrodes 21 are formed in one-to-one correspondence with the pixels PX.

The first electrode 21 is formed into a band linearly extending along the column direction Y in an almost central section of the pixel PX. Adjacent first electrodes 21 are spaced apart and electrically insulated from each other. A portion of the first electrode 21 opposes the drain electrode 74e. The first electrode 21 is electrically connected to the drain electrode 74e through the contact hole 18J.

Note that each pixel PX includes one first electrode 21, but the present invention is not limited to this, and each pixel PX may also include two or more first electrodes 21. Note also that each pixel PX includes two second electrodes 22, but the present invention is not limited to this, and each pixel PX may also include one second electrode 22 or three or more second electrodes 22.

A controller 4 sets the potentials of the first, second, and third electrodes 21, 22, and 23 independently of each other. For example, the controller 4 sets the third electrode 23 at a predetermined constant-potential such as the ground potential, sets the potential of the first electrode 21 at an independent value by controlling the TFT 74, and sets the potential of the second electrode 22 at an independent value by controlling a TFT 14.

The first, second, and third electrodes 21, 22, and 23 are so set as to apply no electric field in a no-voltage-applied state, i.e., when no voltage is applied across the first and second electrodes 21 and 22, across the first and third electrodes 21 and 23, and across the second and third electrodes 22 and 23. In this no-voltage-applied state, the alignment direction of liquid crystal molecules m remains unchanged from the initial state, so the alignment of the liquid crystal layer 40 maintains the initial alignment, i.e., vertical alignment.

The first, second, and third electrodes 21, 22, and 23 are so set as to apply an electric field in a voltage-applied state, i.e., when a voltage is applied across the first and second electrodes 21 and 22, across the first and third electrodes 21 and 23, and across the second and third electrodes 22 and 23. In this voltage-applied state, the alignment direction of the liquid crystal molecules m changes from the initial state along the lines of electric force.

The alignment direction of the liquid crystal molecules m changes into a direction perpendicular to the lines of electric force. The second electrodes 22 are positioned in the center of the liquid crystal layer 40 in the thickness direction. The liquid crystal molecules m in the central section of the liquid crystal layer 40 are aligned almost vertically. Also, the liquid crystal molecules m are aligned to have a pretilt angle at which they are symmetrical near alignment films 10A and 30A with respect to the central section of the liquid crystal layer 40 as a boundary. Accordingly, the alignment in the region of the liquid crystal layer 40, which does not oppose the first and second electrodes 21 and 22, is bend alignment.

In this state, the alignment direction of the liquid crystal molecules m in a region of the liquid crystal layer 40, which opposes the second electrode 22, also changes, and the liquid crystal molecules m are aligned almost horizontally. Consequently, polarization modulation occurs even in the region of the liquid crystal layer 40, which opposes the second electrode 22. Furthermore, in this embodiment, the alignment direction of the liquid crystal molecules m in a region of the liquid crystal layer 40, which opposes the first electrode 21, also changes, and the liquid crystal molecules m are aligned almost horizontally. Consequently, polarization modulation occurs even in the region of the liquid crystal layer 40, which opposes the first electrode 21.

According to the liquid crystal display device of the fourth embodiment configured as described above, the liquid crystal layer 40 is made of a negative-type liquid crystal material. The first, second, and third electrodes 21, 22, and 23 are set at potentials independently of each other.

When a voltage is applied to the liquid crystal layer 40 (when white is displayed), the alignment of most of the liquid crystal layer 40 takes a bend alignment. Therefore, the liquid crystal display panel 2 can have a high response speed equal to that in the OCB mode. Also, polarization modulation occurs even in the region of the liquid crystal layer 40, which opposes the second electrode 22, and contributes to image display. Accordingly, a liquid crystal display device 1 can have a higher contrast.

In addition, even when the liquid crystal layer 40 has a region that is not influenced by an electric field acting between the first and second electrodes 21 and 22 or an electric field acting between the second and third electrodes 22 and 23, an electric field can be made to act between the first and third electrodes 21 and 23. Polarization modulation occurs even in the region of the liquid crystal layer 40, which opposes the first electrode 21, and contributes to image display. The region where no polarization modulation occurs can further be reduced. Therefore, the liquid crystal display device 1 can have a higher contrast.

Furthermore, when no voltage is applied to the liquid crystal layer 40 (when black is displayed), the alignment of the liquid crystal layer 40 (liquid crystal molecules m) is vertical alignment. Since black can be emphasized when displayed, the liquid crystal display device 1 can have a high contrast. It is also possible to reduce the manufacturing cost.

From the foregoing, a liquid crystal display device having a high contrast and high response speed can be obtained.

A modification of the liquid crystal display device according to the above-mentioned fourth embodiment will be explained below. In the fourth embodiment, the liquid crystal layer 40 may also be formed by a positive-type liquid crystal material instead of a negative-type liquid crystal material. In this case, the region where polarization modulation occurs is reduced compared to that of the fourth embodiment, but the alignment of the liquid crystal layer 40 takes splay alignment when a voltage is applied (white is displayed). Therefore, a liquid crystal display device having a high contrast and high response speed can be obtained.

A liquid crystal display device according to the fifth embodiment will be explained below. In this embodiment, the same reference numerals as in the above-described first embodiment denote the same functional parts, and a detailed explanation thereof will be omitted.

Figure 14:
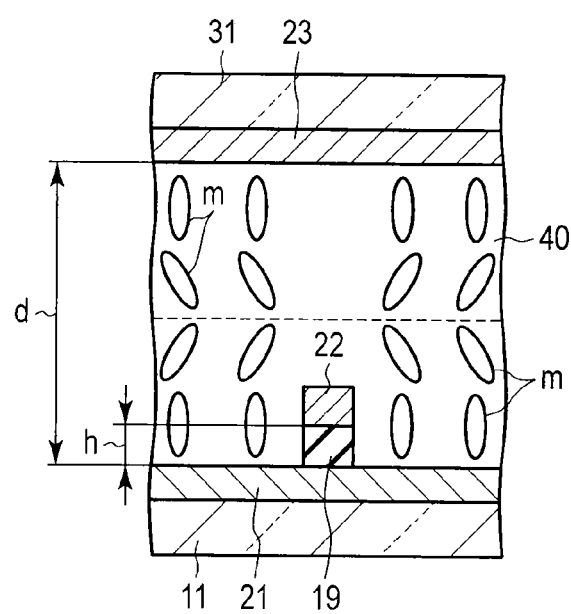
FIG. 14 is a sectional view specifically showing glass substrates, a stage, first to third electrodes, and a liquid crystal layer of a liquid crystal display device of the fifth embodiment, and is a schematic view showing a state in which a voltage is applied to the liquid crystal layer.

FIG. 14 specifically shows a glass substrate 11, first electrode 21, stage 19, second electrode 22, glass substrate 31, third electrode 23, and liquid crystal layer 40 of a liquid crystal display panel 2.

As shown in FIG. 14, an array substrate 10 further includes a plurality of other scanning lines 72, a plurality of other signal lines 73, and a plurality of other TFTs 74 described in the above-mentioned fourth embodiment (FIG. 12).

The first electrodes 21 are formed into islands on an insulating layer 18. Note that the first electrodes 21 are not a solid electrode in this embodiment. The first electrodes 21 are arranged in a matrix. In this embodiment, the first electrodes 21 are formed in one-to-one correspondence with pixels PX. The first electrode 21 is formed into, e.g., a rectangular shape.

In this embodiment, the edges of the first electrode 21 are overlaid on a signal line 13, the signal line 73, a scanning line 12, and the scanning line 72.

Note that each pixel PX includes one second electrode 22, but the present invention is not limited to this, and each pixel PX may also include two or more second electrodes 22.

A thickness (a cell gap: the distance between a portion of an alignment film 10A, which opposes the first electrode 21, and an alignment film 30A) d of the liquid crystal layer 40 is, e.g., about 4 µm. The second electrode 22 is positioned closer to the first electrode 21 or third electrode 23 than the center of the liquid crystal layer 40 in the thickness direction. Note that the dashed line indicates the center of the liquid crystal layer 40 in the thickness direction in FIG. 14.

Figure 4:
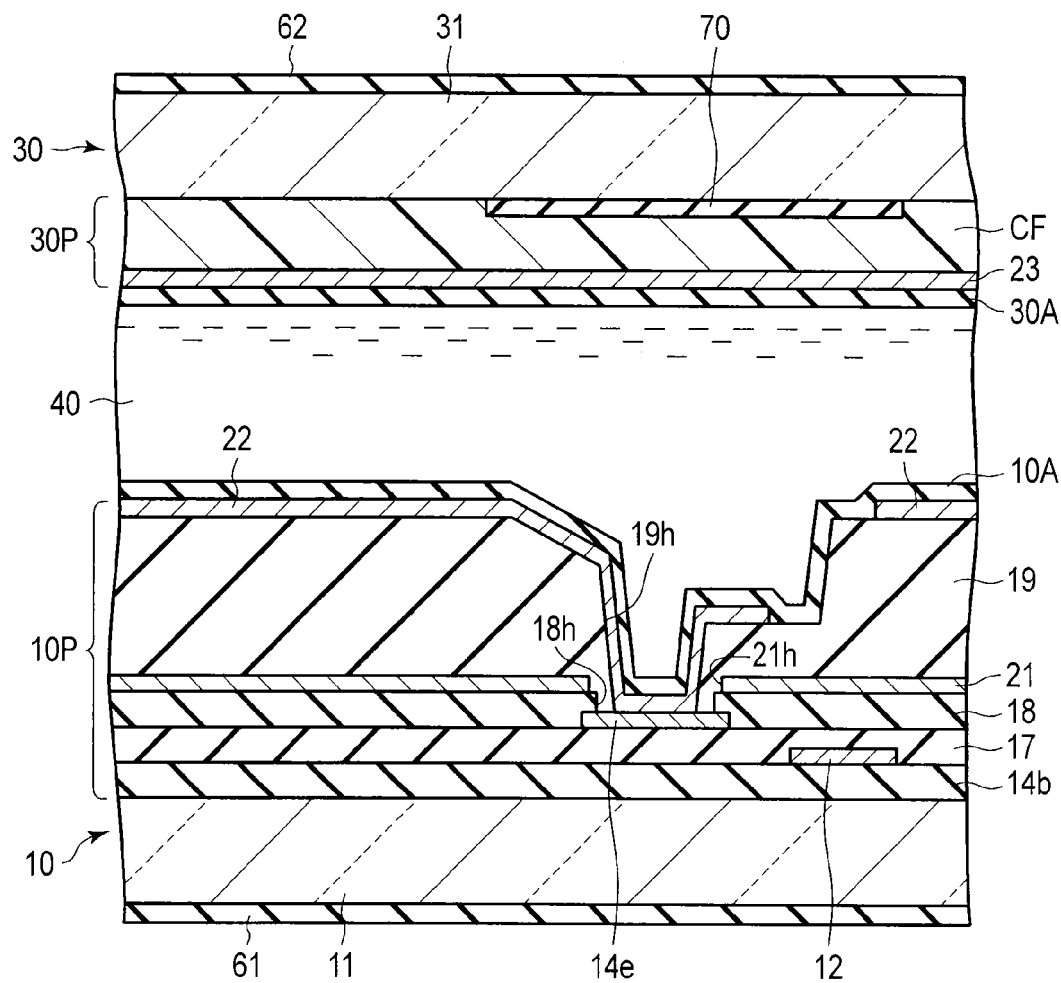
FIG. 4 is a sectional view showing the liquid crystal display panel taken along a line IV-IV in FIG. 3.

In this embodiment, the second electrode 22 is positioned closer to the first electrode 21 than the center of the liquid crystal layer 40 in the thickness direction. The position of the second electrode 22 is determined in accordance with the height of the stage 19. That is, the position of the second electrode 22 is determined by adjusting the height of the stage 19. Also, adjusting the height of the stage 19 as in this embodiment facilitates the formation of a contact hole 19h. In some cases, it is possible to sufficiently form the contact hole 19h without tapering the surface of the stage 19 (FIG. 4).

A controller 4 sets the potentials of the first, second, and third electrodes 21, 22, and 23 independently of each other in accordance with the position of the second electrode 22. For example, the controller 4 sets the third electrode 23 at a predetermined constant-potential such as the ground potential, sets the potential of the first electrode 21 at an independent value by controlling the TFT 74, and sets the potential of the second electrode 22 at an independent value by controlling a TFT 14 (FIG. 11).

In this embodiment, the first, second, and third electrodes 21, 22, and 23 are set at potentials at which the alignment of liquid crystal molecules m on the side of the array substrate 10 and that of the liquid crystal molecules m on the side of a counter substrate 30 are symmetrical with respect to the center of the liquid crystal layer 40 in the thickness direction as a boundary.

The behavior of the liquid crystal molecules m when no voltage is applied and that of the liquid crystal molecules m when a voltage is applied is the same as that described in the first embodiment.

According to the liquid crystal display device of the fifth embodiment configured as described above, the liquid crystal layer 40 is made of a positive-type liquid crystal material. The second electrode 22 can be displaced from the center of the liquid crystal layer 40 in the thickness direction. The first, second, and third electrodes 21, 22, and 23 are set at potentials independently of each other in accordance with the position of the second electrode 22.

The first, second, and third electrodes 21, 22, and 23 are set at potentials at which the alignment of the liquid crystal molecules m on the side of the array substrate 10 and that of the liquid crystal molecules m on the side of the counter substrate 30 are symmetrical with respect to the center of the liquid crystal layer 40 in the thickness direction as a boundary. Accordingly, the same effects as those of the above-described first embodiment can be obtained.

The stage 19 can be made lower than that of the above-described first embodiment. This facilitates forming the stage 19 including the contact hole 19h.

From the foregoing, a liquid crystal display device having a high contrast and high response speed can be obtained.

A modification of the liquid crystal display device according to the above-mentioned fifth embodiment will be explained below. In the fifth embodiment, the liquid crystal layer 40 may also be formed by a positive-type liquid crystal material instead of a negative-type liquid crystal material. In this case, the alignment of the liquid crystal layer 40 takes splay alignment when a voltage is applied (white is displayed), so a liquid crystal display device having a high contrast and high response speed can be obtained. Also, polarization modulation occurs even in the region of the liquid crystal layer 40, which opposes the second electrode 22, and contributes to image display. Consequently, a liquid crystal display device 1 can have a higher contrast.

A liquid crystal display device according to the sixth embodiment will be explained below. In this embodiment, the same reference numerals as in the above-described first embodiment denote the same functional parts, and a detailed explanation thereof will be omitted.

FIGS. 17 and 18 specifically show a glass substrate 11, a first electrode 21, stages 19 (19Y1 and 19Y2), a second electrode 22, a glass substrate 31, and a liquid crystal layer 40 of a liquid crystal display panel 2.

Figure 16:
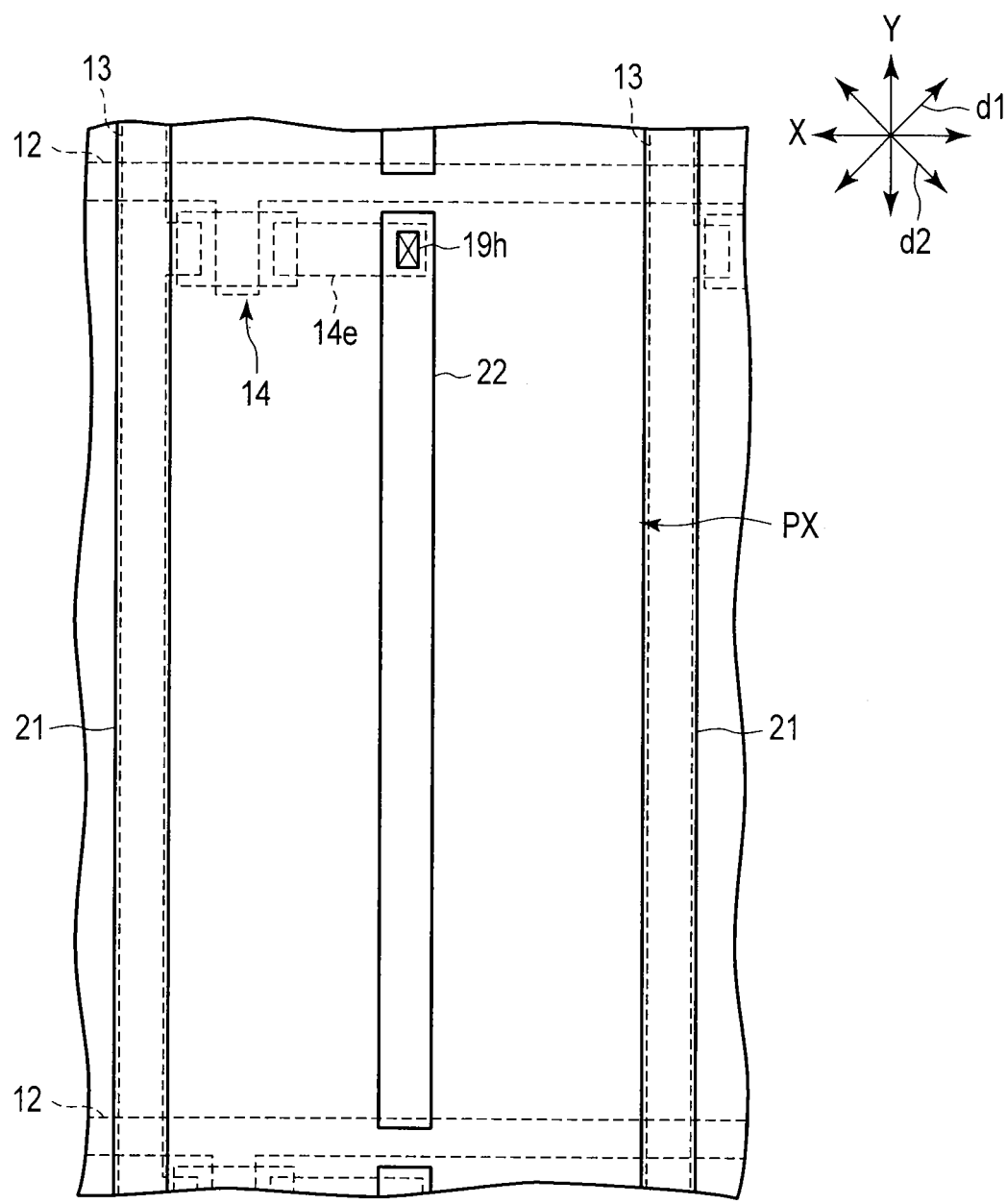
FIG. 16 is an enlarged plan view showing a part of an array substrate shown in FIG. 15, and is a view showing one pixel.

As shown in FIGS. 15, 16, and 17, a plurality of stages 19 are provided on an insulating layer 18. The plurality of stages 19 are formed into bands linearly extending along a column direction Y, and spaced apart from each other in a row direction X. The plurality of stages 19 can be classified into stages 19Y1 as first stages, and stages 19Y2 as second stages.

The stage 19Y1 is formed into a band linearly extending along the column direction Y in the boundary between pixels PX. The stage 19Y1 is shared by a plurality of pixels PX arranged in the column direction Y, and shared by the pixels PX adjacent to each other in the row direction X. The stage 19Y1 opposes a signal line 13. The stage 19Y1 includes a first electrode formation surface for the first electrode 21.

The stage 19Y2 is formed into a band linearly extending along the column direction Y in an almost central section of the pixel PX. The stage 19Y2 is shared by a plurality of pixels PX arranged in the column direction Y. The stage 19Y2 includes a contact hole 19h opposing a drain electrode 14e and contact hole 18h (FIG. 4). The stage 19Y2 includes a second electrode formation surface for the second electrode 22.

In this embodiment, the stages 19 (19Y1 and 19Y2) are formed high. The first electrode formation surface of the stage 19Y1 and the second electrode formation surface of the stage 19Y2 are positioned closer to a counter substrate 30 than a portion of an alignment film 10A (FIG. 4), which does not oppose the stage 19Y1, first electrode 21, stage 19Y2, and second electrode 22.

The first electrode 21 is provided on the first electrode formation surface of the stage 19Y1. The first electrode 21 is made of a light-transmitting conductive material, e.g., ITO. In this embodiment, the first electrode 21 is formed into a band linearly extending along the column direction Y. The first electrode 21 is shared by a plurality of pixels PX arranged in the column direction Y, and shared by the pixels PX adjacent to each other in the row direction X.

Note that the first electrode 21 is not limited to a band, and can be deformed into various shapes. For example, the first electrodes 21 may also be formed into islands, and connected to connection electrodes (not shown) extending in the row direction. In this case, each connection electrode is shared by a plurality of pixels PX arranged in the row direction X.

The second electrodes 22 are formed into islands. The second electrodes 22 are arranged in a matrix. The second electrode 22 is provided on the second electrode formation surface of the stage 19Y2. The second electrode 22 is formed into a band linearly extending along the column direction Y in an almost central portion of the pixel PX. The second electrodes 22 of adjacent pixels PX are spaced apart and electrically insulated from each other. A part of the second electrode 22 opposes the drain electrode 14e. The second electrode 22 is electrically connected to the drain electrode 14e through the contact hole 18h (FIG. 4) and the contact hole 19h. The second electrode 22 is made of a light-transmitting conductive material, e.g., ITO.

Note that each pixel PX includes two first electrodes 21, but the present invention is not limited to this, and each pixel PX may also include one first electrode 21 or three or more first electrodes 21. Note also that each pixel PX includes one second electrode 22, but the present invention is not limited to this, and may also include two or more second electrodes 22.

The first electrode 21 and second electrode 22 can be formed by a light-transmitting conductive material such as ITO, but may also be formed by a light-shielding conductive material such as a metal (e.g., aluminum). Likewise, the stages 19 (19Y1 and 19Y2) can be formed by a light-transmitting insulating material, but may also be formed by a light-shielding insulating material.

The alignment film 10A covers the first electrodes 21, second electrodes 22, and the like. In this embodiment, the alignment film 10A is a horizontal alignment film. An alignment film treatment process (e.g., rubbing) is performed on the alignment film 10A in the column direction Y.

On the other hand, the counter substrate 30 has no third electrode 23. Therefore, an alignment film 30A is provided on a color filter CF (a counter pattern 30P). In this embodiment, the alignment film 30A is a horizontal alignment film. An alignment film treatment process (e.g., rubbing) is performed on the alignment film 30A in the column direction Y. The alignment direction of the alignment films 10A and 30A is a direction perpendicular to a direction in which the first and second electrodes 21 and 22 oppose each other.

The liquid crystal layer 40 is made of a positive-type liquid crystal material.

The liquid crystal display panel 2 is a normally black type panel in which light is shielded when no voltage is applied to the liquid crystal layer 40.

A controller 4 sets the potentials of the first and second electrodes 21 and 22. For example, the controller 4 sets the first electrode 21 at a predetermined constant-potential such as the ground potential, and sets the potential of the second electrode 22 at a value independent of the first electrode 21 by controlling a TFT 14.

The first electrode formation surface of the stage 19Y1 and the second electrode formation surface of the stage 19Y2 are positioned closer to the counter substrate 30 than a portion of the alignment film 10A, which does not oppose the stage 19Y1, first electrode 21, stage 19Y2, and second electrode 22.

In this embodiment, a height h of the stages 19 (19Y1 and 19Y2) is about ½ a thickness (a cell gap: the distance between the portion of the alignment film 10A, which does not oppose the stage 19Y1, first electrode 21, stage 19Y2, and second electrode 22, and the alignment film 30A) d of the liquid crystal layer 40. In this embodiment, therefore, the first and second electrodes 21 and 22 are positioned in the center of the liquid crystal layer 40 in the thickness direction. The height h of the stages 19 is so set that the first and second electrodes 21 and 22 are positioned as described above.

Also, in this embodiment, polarizers 61 and 62 are arranged by a crossed Nichol arrangement, the polarizer 61 has a transmission axis parallel to the column direction Y, and the polarizer 62 has a transmission axis parallel to the row direction X (FIG. 1). Alternatively, the polarizer 61 has a transmission axis parallel to the row direction X, and the polarizer 62 has a transmission axis parallel to the column direction Y.

As shown in FIG. 17, the first and second electrodes 21 and 22 are so set as to apply no electric field in a no-voltage-applied state, i.e., when no voltage is applied across the first and second electrodes 21 and 22. In this no-voltage-applied state, the alignment direction of liquid crystal molecules m remains unchanged from the initial state.

The liquid crystal layer 40 transmits polarized light entering from the polarizer 61 while maintaining the polarized state, and outputs the polarized light to the polarizer 62. The polarized light output to the polarizer 62 is not transmitted through it because the polarized light is perpendicular to the direction in which the transmission axis of the polarizer 62 extends. That is, the probability (transmittance) at which the polarized light entering from the liquid crystal layer 40 is transmitted through the polarizer 62 is almost 0%. This allows the polarizer 62 to shield the polarized light entering from the liquid crystal layer 40, and sufficiently display black. From the foregoing, black can be emphasized in the no-voltage-applied state, and this contributes to a high contrast.

As shown in FIG. 18, the first and second electrodes 21 and 22 are so set as to apply an electric field in a voltage-applied state, i.e., when a voltage is applied across the first and second electrodes 21 and 22. In this voltage-applied state, the alignment direction of the liquid crystal molecules m changes from the initial state along the lines of electric force.

At a wavelength of 550 nm, the retardation of the liquid crystal layer 40 is about a ½ wavelength. The liquid crystal layer 40 outputs incident linearly polarized light by twisting it through about 90°. Consequently, the liquid crystal layer 40 outputs, to the polarizer 62, the polarized light (linearly polarized light) in the row direction X obtained from the polarized light in the column direction Y coming from the polarizer 61. That is, the probability (transmittance) at which the polarized light coming from the liquid crystal layer 40 is transmitted through the polarizer 62 is almost 100%. This allows the polarizer 62 to transmit the polarized light coming from the liquid crystal layer 40, and sufficiently display an image.

According to the liquid crystal display device of the sixth embodiment configured as described above, a liquid crystal display device 1 comprises the array substrate 10, the counter substrate 30, and the liquid crystal layer 40. The array substrate 10 includes the stages 19Y1 including the first electrode formation surfaces, the first electrodes 21, the stages 19Y2 including the second electrode formation surfaces, the TFTs 14, the second electrodes 22, and the alignment film 10A. The first and second electrode formation surfaces are positioned closer to the counter substrate 30 than the portion of the alignment film 10A, which does not oppose the stage 19Y1, first electrode 21, stage 19Y2, and second electrode 22. The counter substrate 30 includes the alignment film 30A. The liquid crystal layer 40 is made of a positive-type liquid crystal material, and the alignment direction of the liquid crystal molecules m changes along the lines of electric force.

When no voltage is applied to the liquid crystal layer 40 (when black is displayed), black can be emphasized when displayed because the liquid crystal display panel 2 is configured as described above. Accordingly, the liquid crystal display device 1 can have a high contrast.

When a voltage is applied to the liquid crystal layer 40 (when white is displayed), the liquid crystal molecules m near the interfaces of the liquid crystal layer 40 (near the array substrate 10 and counter substrate 30) also contribute to the modulation factor of polarization, so the retardation of the liquid crystal layer 40 can be decreased. For example, the thickness of the liquid crystal layer 40 can be decreased. This makes it possible to improve the contrast when compared to a conventional IPS-mode liquid crystal display device.

This is so because the first and second electrodes 21 and 22 are positioned in the center of the liquid crystal layer 40 in the thickness direction, so the distance between the liquid crystal molecules m near the alignment film 10A and those near the alignment film 30A shortens. Since the intensity of an electric field to be applied to mid-plane liquid crystal molecules m that are hardest to move increases, the motion of the liquid crystal molecules m becomes fast, so a high-speed response can be expected.

Note that in the conventional IPS-mode liquid crystal display device, liquid crystal molecules near the interface (near the counter substrate) of the liquid crystal layer, which is farther from the electrode, hardly contributes to the modulation factor of polarization. Accordingly, the retardation (Δnd) of the liquid crystal layer must be increased in order to improve the above-mentioned modulation factor. Δn indicates the refractive anisotropy of the liquid crystal material, and d indicates the thickness of the liquid crystal layer as described previously. However, if Δnd is increased, the scattering component of a liquid crystal increases. This decreases the contrast of the conventional IPS-mode liquid crystal display device.

Since the liquid crystal display device 1 can be formed without any optically compensation film (retardation film), the manufacturing cost can be reduced.

From the foregoing, a liquid crystal display device having a high contrast and high response speed can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the embodiments of the present invention are not limited to the above-mentioned liquid crystal display devices, and are applicable to various liquid crystal display devices.

What is claimed is:

1. A liquid crystal display device comprising:
a first substrate comprising a first electrode, a stage including an electrode formation surface, a switching element, a second electrode provided on the electrode formation surface and electrically connected to the switching element, and a first vertical alignment film covering the first electrode and the second electrode;
a second substrate which comprises a third electrode opposing the first electrode and the second electrode, and a second vertical alignment film covering the third electrode, and is arranged opposite to the first substrate with a gap therebetween; and
a liquid crystal layer held between the first substrate and the second substrate,
wherein the electrode formation surface is positioned closer to the second substrate than a portion of the first vertical alignment film, which opposes the first electrode,
wherein a height of the stage is set such that the second electrode is positioned in a center of the liquid crystal layer in a thickness direction.

2. The device according to claim 1, further comprising:
a controller configured to set potentials of the first electrode, the second electrode, and the third electrode.

3. The device according to claim 1, wherein the first electrode, the second electrode, and the third electrode are made of a transparent conductive material.

4. The device according to claim 1, wherein
the first electrode and the third electrode are solid electrodes and set at the same potential,
the second electrode is formed into an island, and
the liquid crystal layer is made of a positive-type liquid crystal material.

5. The device according to claim 1, wherein
the first electrode and the third electrode are solid electrodes and set at the same potential,
the second electrode is formed into an island,
the stage is made of a transparent insulating material, and
the liquid crystal layer is made of a negative-type liquid crystal material.

6. The device according to claim 1, wherein
the first substrate further comprises another switching element electrically connected to the first electrode,
the first electrode and the second electrode are formed into islands,
the third electrode is a solid electrode,
the first electrode, the second electrode, and the third electrode are set at potentials independent of each other,
the stage is made of a transparent insulating material, and
the liquid crystal layer is made of a negative-type liquid crystal material.

7. The device according to claim 1, wherein
the first substrate further comprises another switching element electrically connected to the first electrode,
the first electrode and the second electrode are formed into islands,
a position of the second electrode is determined in accordance with a height of the stage,
the third electrode is a solid electrode, and
the first electrode, the second electrode, and the third electrode are set at potentials independent of each other in accordance with the position of the second electrode.

8. The device according to claim 7, wherein the first electrode, the second electrode, and the third electrode are set at potentials at which an alignment of liquid crystal molecules on a side of the first substrate and an alignment of liquid crystal molecules on a side of the second substrate are symmetrical with respect to the center of the liquid crystal layer in the thickness direction.

9. A liquid crystal display device comprising:
a first substrate comprising a first stage including a first electrode formation surface, a first electrode provided on the first electrode formation surface, a second stage including a second electrode formation surface, a switching element, a second electrode provided on the second electrode formation surface, electrically connected to the switching element, and set at a potential independent of the first electrode, and a first horizontal alignment film covering the first electrode and the second electrode;
a second substrate which comprises a second horizontal alignment film, and is arranged opposite to the first substrate with a gap therebetween; and
a liquid crystal layer held between the first substrate and the second substrate,
wherein the first electrode formation surface and the second electrode formation surface are positioned closer to the second substrate than a portion of the first horizontal alignment film, which does not oppose the first stage, the first electrode, the second stage, and the second electrode, wherein heights of the first stage and the second stage are set such that the first electrode and the second electrode are positioned in a center of the liquid crystal layer in a thickness direction.

10. The device according to claim 9, further comprising:

a controller configured to independently set potentials of the first electrode and the second electrode.

11. The device according to claim 9, wherein an alignment direction of the first horizontal alignment film and the second horizontal alignment film is a direction perpendicular to a direction in which the first electrode and the second electrode oppose each other, and the liquid crystal layer is made of a positive-type liquid crystal material.

* * * * *